(12) United States Patent
Bross et al.

(10) Patent No.: US 12,164,490 B2
(45) Date of Patent: Dec. 10, 2024

(54) OBSERVABILITY LOOP

(71) Applicant: Snowflake Inc., Bozeman, MT (US)

(72) Inventors: Jan Bross, San Mateo, CA (US); Mustafa Kamil Iman, Cupertino, CA (US); Senthil Kumar Ramamoorthy, Fremont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/051,276

(22) Filed: Oct. 31, 2022

(65) Prior Publication Data

US 2024/0143565 A1 May 2, 2024

(51) Int. Cl.
*G06F 16/00* (2019.01)
*G06F 16/21* (2019.01)
(52) U.S. Cl.
CPC .................... *G06F 16/217* (2019.01)
(58) Field of Classification Search
CPC .................................................. G06F 16/217
See application file for complete search history.

(56) References Cited

U.S. PATENT DOCUMENTS

| 2016/0205127 | A1* | 7/2016 | Roehl | H04L 63/1433 |
| | | | | 726/25 |
| 2019/0384257 | A1* | 12/2019 | Zhang | G06F 11/008 |
| 2022/0058069 | A1* | 2/2022 | Bhatia | G06F 16/2379 |
| 2022/0067046 | A1* | 3/2022 | Katroulis | G06F 11/3419 |

\* cited by examiner

*Primary Examiner* — Paul Kim
(74) *Attorney, Agent, or Firm* — Schwegman Lundberg & Woessner, P.A.

(57) ABSTRACT

Techniques for managing cluster of devices are described. The clusters may refer to machines or instances of transactional database. A server may control cluster management. The server may operate an observability loop to manage the clusters. The observability loop may operate a plurality of observer phases in parallel, each observer phase monitoring a different parameter relating to the health of the cluster and generating a recommended action to improve the health of the cluster if an incident is present. The observability loop may rank the recommended actions from the different observer phases and may execute the highest ranked recommended action.

18 Claims, 6 Drawing Sheets

OBSERVABILITY LOOP

TECHNICAL FIELD

The present disclosure generally relates to flexible computing, and, more specifically, cluster management using an observability loop.

BACKGROUND

As the world becomes more data driven, database systems and other data systems are storing more and more data. For a business to use this data, different operations or queries are typically run on this large amount of data. Some operations, for example those including large table scans or executing multiple queries, can take a substantial amount of time to execute on a large amount of data.

In some systems, table data may be stored in one database and metadata for that table may be stored in another database. Execution of operations, such as queries, may rely on accessing both tables. This also may lead to slower processing times.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for managing cluster of devices are described. The clusters may refer to machines or instances of a transactional database (TDB). A server (e.g., compute service manager) may control cluster management. The server may operate an observability loop to manage the clusters. The observability loop may operate a plurality of observer phases in parallel, each observer phase monitoring a different parameter relating to the health of the cluster and generating a recommended action to improve the health of the cluster if an incident is present. The observability loop may rank the recommended actions from the different observer phases and may execute the highest ranked recommended action. The observability loop may then return to monitoring the cluster in its next periodic iteration. Hence, the observability loop, as described herein, can be scalable as cluster sizes increase.

Figure 1:
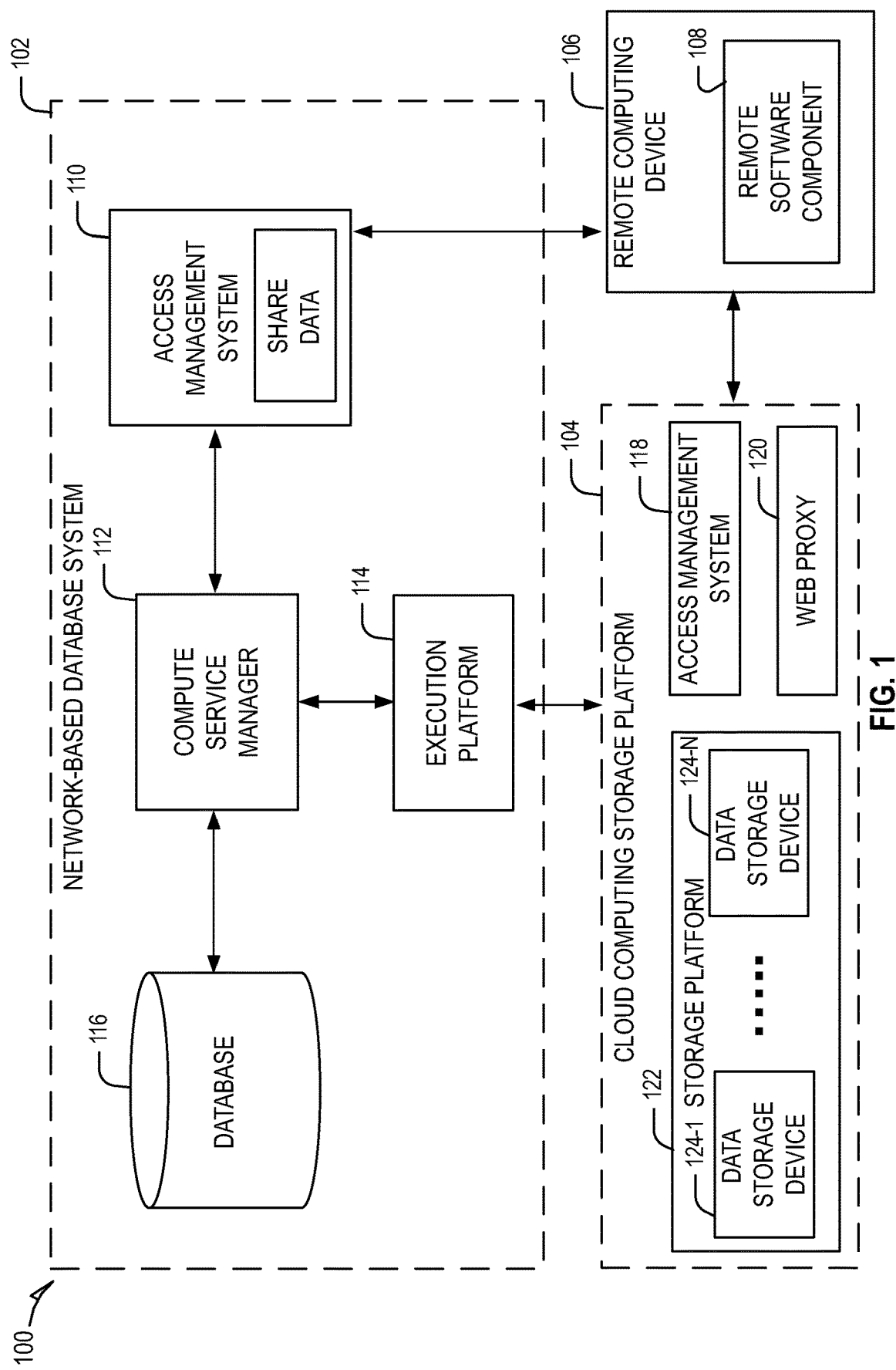
FIG. 1 illustrates an example computing environment in which a cloud database system, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
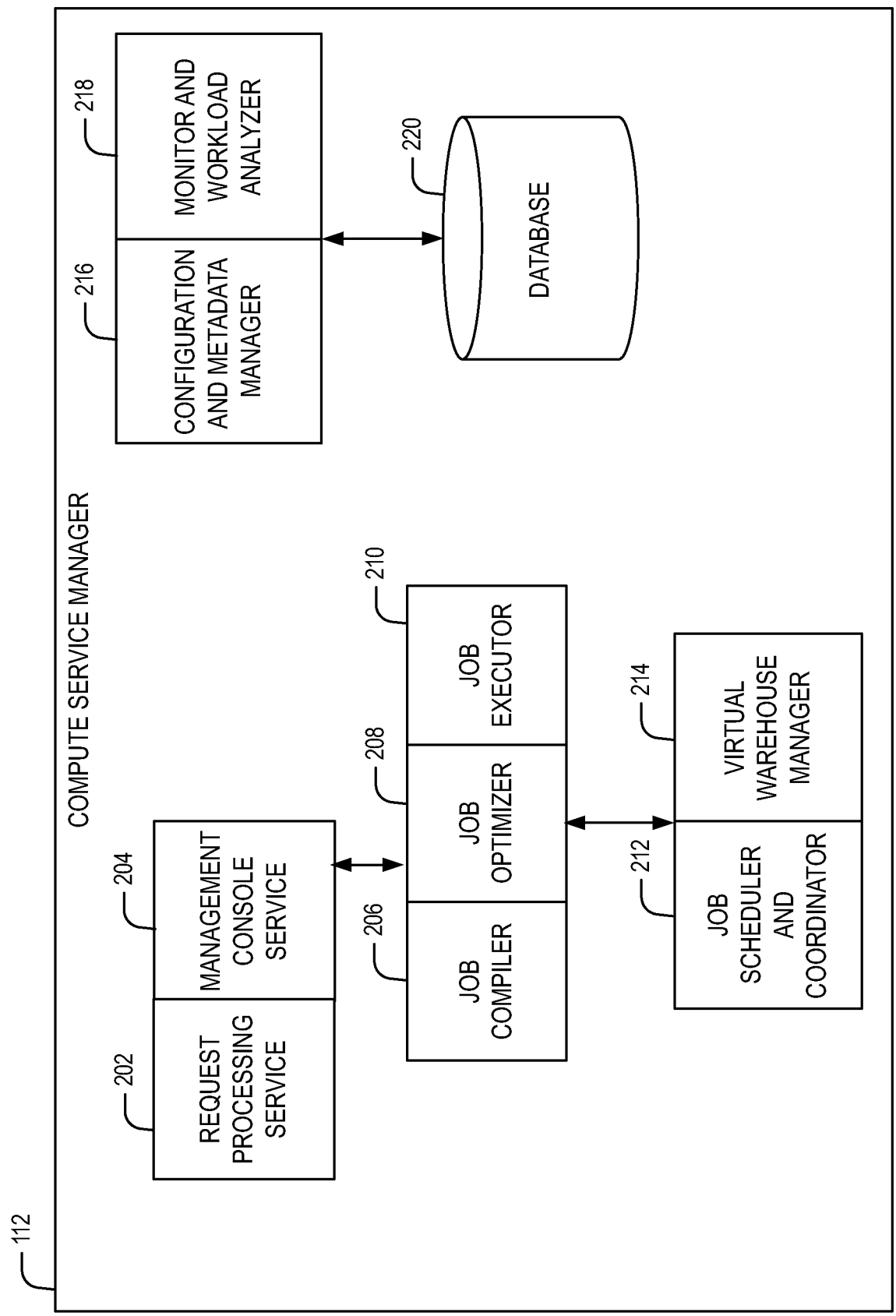
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
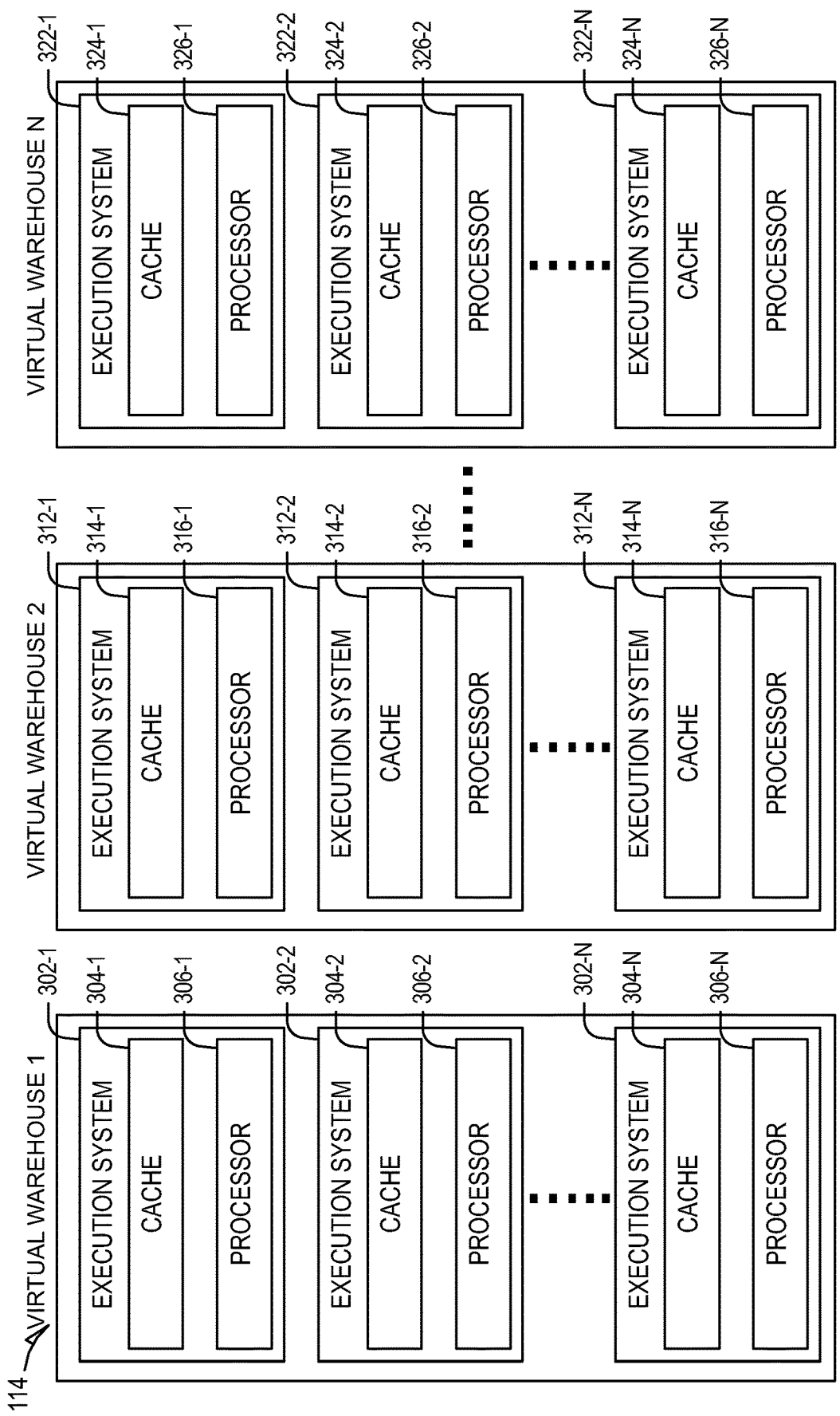
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processorintensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, table data (e.g., user data, transactional data) and metadata (e.g., analytical data) may be stored separately. For example, table data may be stored in a database (e.g., database 116, database 122) while metadata may be stored in a separate database. Table data and metadata have different query patterns. Generally, table data queries are for a large amount of rows with a few columns. Metadata queries, on the other hand, generally directed to a few rows with many columns. A compute service manager may then interact with both databases to perform certain operations such as executing queries.

In some embodiments, table data may also be stored in a transactional database (TDB). For example, transactional data and analytical data can be saved on a single platform (TDB) using a single, unified data set, making analysis of both transactional and analytical data together more efficient. Table data and metadata for that table data may be stored in TDB clusters, where the TDB platform is distributed across a plurality of machines or instances.

Figure 4:
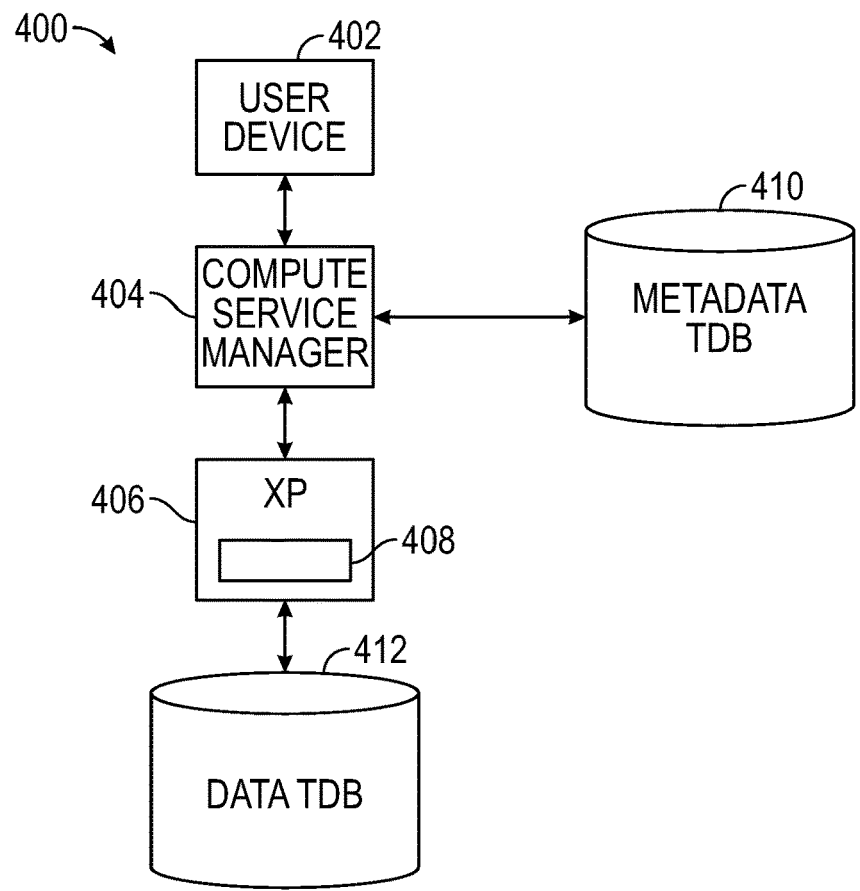
FIG. 4 illustrates an example computing environment, according to some example embodiments.

FIG. 4 illustrates an example computing environment 400, according to some example embodiments. The computing environment may include a user device 402, a compute service manager 404, an execution platform (XP) 406 with a transaction management layer 408, a metadata TDB 410, and a data TDB 412.

The user device 402 may be provided as a remote computing device as described herein (e.g., remote computing device 106) to interact with the compute service manager 404. The compute service manager 404 may be provided with the functionalities described herein (e.g., compute service manager 112). The compute service manager 404 may interact with the metadata TDB 410 to store and retrieve metadata associated with user data. The XP 406 may be provided with the functionalities described herein (e.g., execution platform 114). The XP 406 may be provided as one or more XPs. The XP 406 may include the transaction management layer 408 to interact with the data TDB 412 to store and retrieve user data (e.g., table data). The metadata TDB 410 and data TDB 412 may be provided as s single TDB platform.

Figure 5:
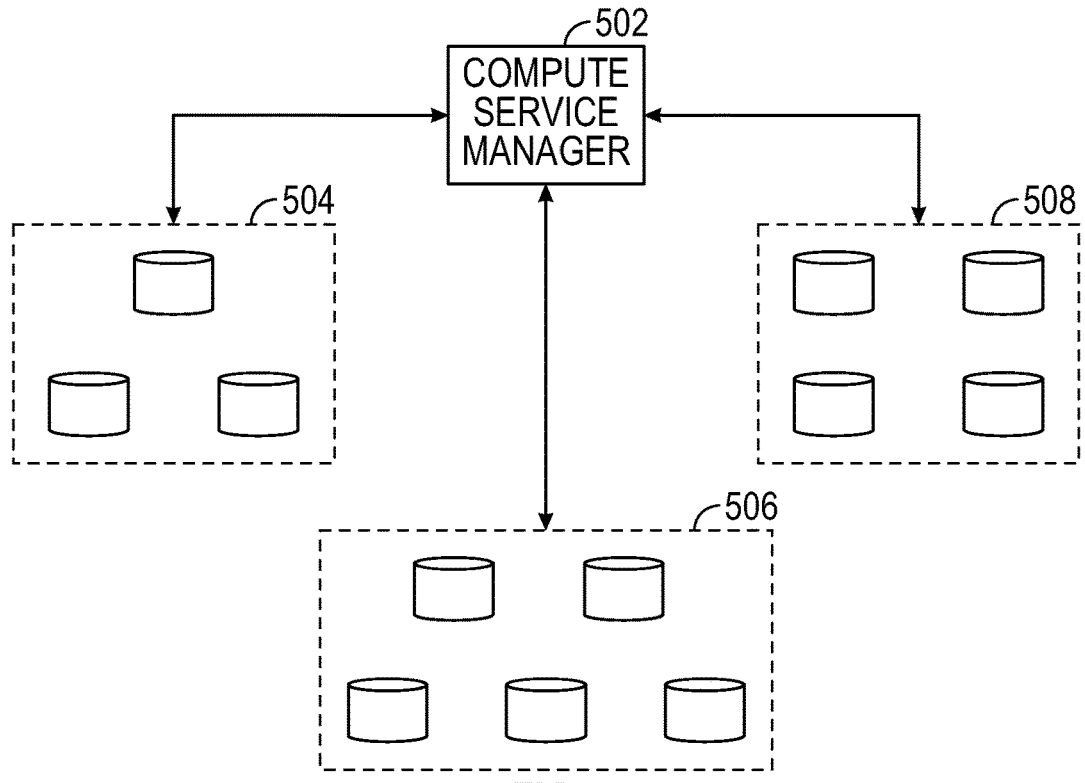
FIG. 5 illustrates a transactional database (TDB) cluster architecture, according to some example embodiments.

The TDB platform(s) may be provided in a distributed manner using a plurality of machines or instances. FIG. 5 illustrates a TDB cluster architecture, according to some example embodiments. The TDB cluster architecture may include a compute service manager 502, a first TDB cluster 504, a second TDB cluster 506, and a third TDB cluster 508. The compute service manager 502 may handle TDB cluster management, as described in further detail below. In some embodiments, the compute service manager 502 may be dedicated to cluster management (e.g., operating the observability loop), while other compute service managers may handle other operations such as query processing.

The TDB clusters 504-508 may each include one or more machines or instances running TDB. The clusters 504-508 may be of different sizes and the sizes of the cluster 504-508 may change dynamically based on cluster management techniques, described in further detail below. Also, the number of clusters may change dynamically. For example, there may be hundreds or thousands of TDB clusters. Each cluster 504-508 may service different set of accounts of the data system. For example, cluster 504 may service accounts A-D, cluster 506 may service accounts G-K, and cluster 508 may service accounts X-Z. The accounts serviced by a cluster may change and may be controlled by the compute service manager 502.

The compute service manager 502 may control cluster management techniques. The compute service manager 502 may gather information from the clusters 504-508, monitor different parameters, and make changes to the TDB clusters 504-508, as described in further detail below. In some embodiments, the size of the TDB clusters may be scaled up or down based on usage patterns. Different types of machines may be added or removed from a cluster. New TDB clusters may be added, and some TDB clusters may be removed.

An observability loop may provide a framework for managing distributed systems, such as TDB clusters. The observability loop may be executed by a compute service manager (e.g., compute service manager 502) to monitor and make automatic changes to TDB cluster properties.

Figure 6:
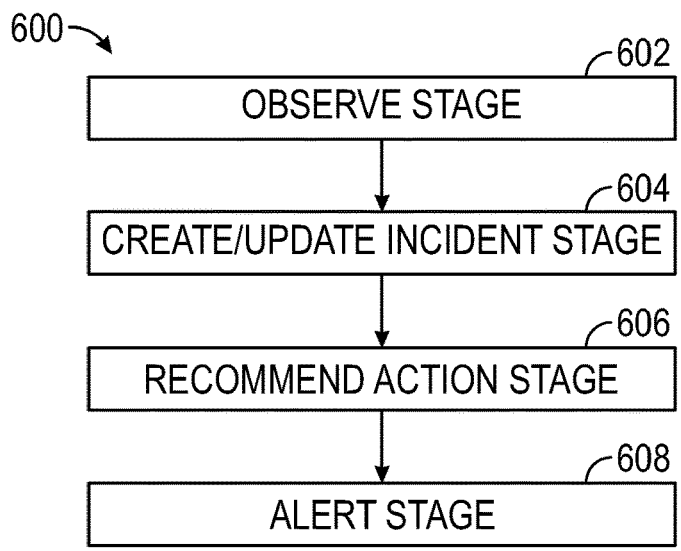
FIG. 6 illustrates stages of an observability loop, according to some example embodiments.

FIG. 6 illustrates stages of an observability loop 600, according to some example embodiments. The observability loop may run different observer phases in parallel. The observer phases may monitor different properties of the cluster. The observer phases in the observability loop may include four stages: observe stage 602, create/update incident stage 604, recommend action stage 606, and an alert stage 608. The observability loop 600 may run each observer phase periodically on the clusters under management.

In the observe stage 602, the observability loop 600 may collect information, such as metrics and internal state of the cluster. The collected information may include operational metrics and other information about the health of the cluster. If the observability loop determines that the cluster is healthy based on the collected information, the create/update incident stage 604 is skipped and the observability loop returns to the observe stage 602 for its next periodic loop operation. Some observer phases may also store history information in memory.

Otherwise, in the create/update incident stage 604, either a new incident is created or an existing incident is updated with new information collected from the observe stage 602. An incident is a collection of metadata that is relevant to the health of the cluster for a certain observer phase. An incident may also include prior actions taken to resolve the incident or recover a cluster. Incidents may include metadata, such as cluster identification (if applicable), list of instance identification (if applicable), list of process ports (if applicable), incident creation time, incident resolved time. There is a one-to-one mapping between an observer phase and incident type. Because an observer phase monitors a specific parameter, an observer phase can create a single type of incident related to the respective parameter. If there is no incident, the recommend action stage 606 is skipped and the observability loop returns to the observe stage 602 for its next periodic loop operation.

Otherwise, an action is recommended by the observer phase in the recommend action stage 606. Observer phases may recommend tiered actions based on history information, such as how long an incident has been persisting. The observability loop 600 may collect the actions recommended by the different observability phase. The observability loop 600 may then select one of the recommended actions by the different observer phases and may execute the selected action. The actions may be tiered (e.g., hierarchy), and the highest tiered action may be selected for execution. Thus, one action is executed per observability loop. The observability loop may then return to observe stage 602 for its next periodic loop operation.

Each observability phase may have a threshold for a number of actions taken before an alert is generated to an engineer. If a threshold for a number of actions taken for an observer phase has been reached, an alert may be generated and transmitted to an engineer alerting the engineer of the incident that led to the alert in the alert stage 608. The engineer may then take further corrective action to resolve the incident and restart the observability loop.

Figure 7:
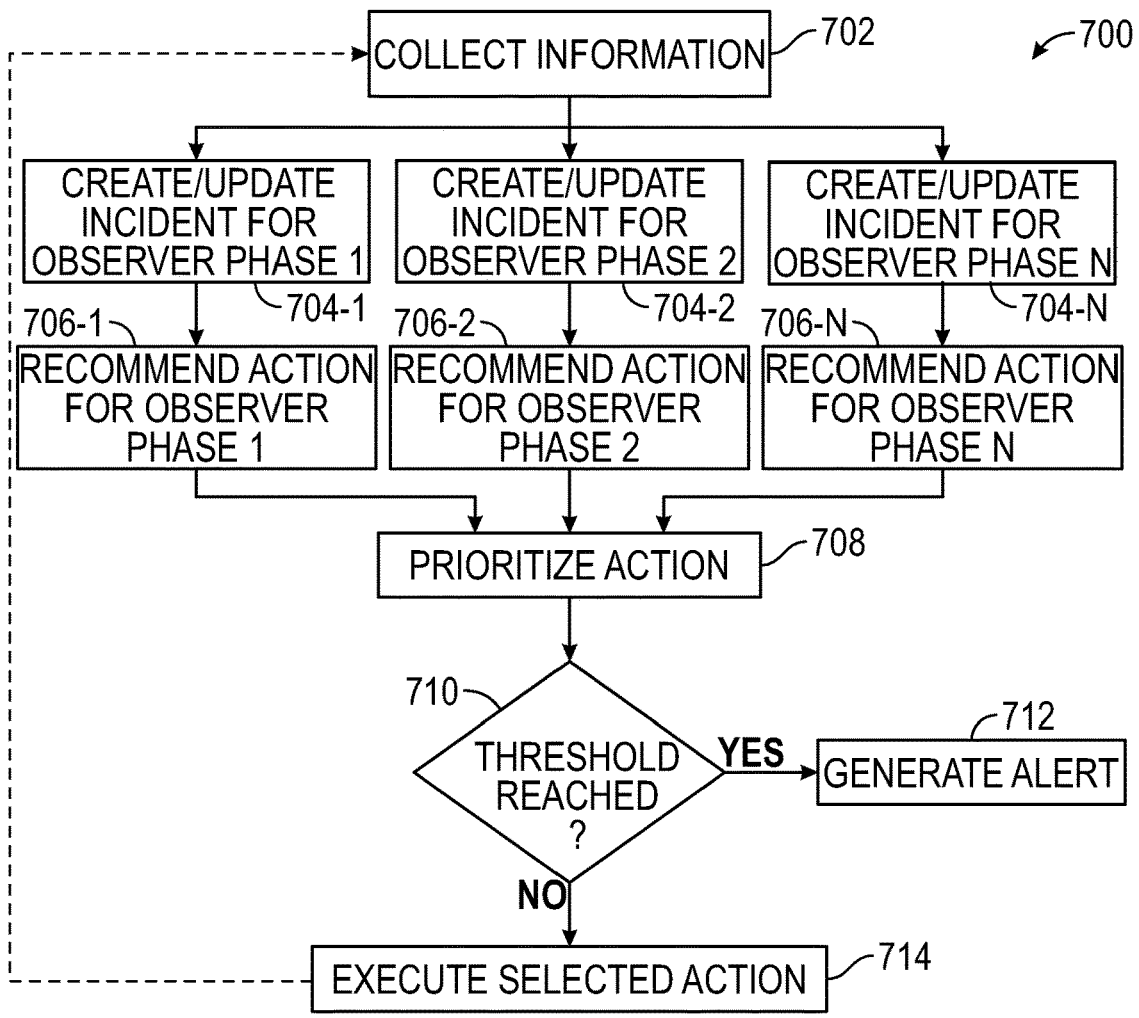
FIG. 7 is a flow diagram of a method for operating an observability loop, according to some example embodiments.

FIG. 7 illustrates a flow diagram for a method 700 for operating an observability loop, according to some example embodiments. The method 700 may be executed by a compute service manager configured for managing TDB clusters as described herein (e.g., compute service manager 502).

At operation 702, the compute service manager may collect information regarding the health of the monitored TDB clusters. The information collection may be performed periodically. For example, the information may be collected every 30 seconds, 1 minute, 5 minutes, etc.

The collection information may include operational metrics and internal state information regarding the cluster. In some embodiments, the operational metrics can be collected by using a status command, such as status command. In response to the status command, each TDB cluster may output its relevant operational metric information. The operational metric information may include metrics about CPU utilization, memory usage (e.g., absolute free memory space, percentage of free memory space), disk utilization, etc.

Internal state information may include information regarding cluster topology, such as how many instances/machines in a cluster, types of instances/machines, which version of TDB is being used, etc. The internal state information may include a snapshot of the cluster topology.

The collected information may then be passed to different observer phases of the observability loop. Each observer phase may monitor a different parameter of the TDB clusters. For example, one observer phase may monitor disk utilization, a second observer phase may monitor pending transactions, a third observer phase may monitor CPU utilization, and so on. Moreover, the collected information may include states of pending actions in the cluster.

At operations 704-1-704-n, the collected information may be passed to each observer phase, and each observer phase may analyze relevant collected information for its monitored parameter and may determine if an incident should be created/updated. An incident is a collection of metadata that is relevant to the health of the cluster for a certain observer phase. For example, if the collected information includes information that CPU utilization in a respective cluster exceeds a specified threshold, the respective observer phase may then update/create an incident.

Information may be stored regarding whether a prior incident was created for the respective observer phase. If the observer phase determines that there was a prior incident, the observer phase may then update the incident with the new information collected. If the observer phase determines that there was no prior incident, the observer phase may then create a new incident with the new information collected. If the observer phase determines that the cluster is healthy with respect to its respective monitored parameter, no incident is created/updated.

At operations 706-1-706-n, each observer phase with a created/updated incident may recommend an action to resolve the respective incident. Observer phases with no created/updated incidents skip operations 706-1-706-n. Each observer phase with a created/updated incident may generate the recommendation independently. That is, the observer phase for monitoring CPU utilization may generate a recommended action for resolving high CPU utilization without taking into consideration other observer phases. Recommended actions may vary in degree. For example, a recommended action may include a relative non-disruptive action such as restarting a single process related to the respective incident. A recommended action may also include action such as restarting a machine, restarting all processes in a cluster, restarting TDB service in all machines of a cluster, generating an alert, etc., each with different degrees of disruption to the operation of the TDB cluster.

At operation 708, the compute service manager may gather all recommended actions by the respective observer phases with pending incidents, rank/prioritize the actions, and may select the highest ranked/prioritized action. The prioritization may be based on the level of disruption. For example, the actions with lower levels of disruption the operation of the TDB cluster may be ranked lower than actions that have a higher level of disruption. In some embodiments, the prioritization may be set based on the following non-exhaustive levels of disruptive actions:

ALERT (highest level of disruption)>
BOUNCE_CLUSTER_BY_SERVICE_RESTART (restarting TDB service in all clusters, which will terminate all pending processes in all clusters)>
BOUNCE_CLUSTER_BY_KILL_ALL (restarting all processes in a given cluster)>
MACHINE_RESTART (restarting a specified machine in a cluster)>
BOUNCE_PROCESS (restarting a specified process)

Other actions may also be included in the prioritization such as scaling up or down the number machines in a cluster. Scaling up or down may be considered lower degrees of disruptive actions.

The compute service manager may gather the recommended actions by the respective observer phases with pending incidents, and then may select the action with the highest disruption level. For example, if one observer phase recommends an alert and another observe phase recommends restarting a specified process, the compute service manager may select the alert as the action to be performed in the respective iteration of the observability loop.

At operation 710, the compute service manager may check if the selected action has reached a threshold number of actions for the respective incident. If the action threshold has been exceeded, the selected action may not be performed, and an alert may be generated at operation 712. This threshold check may be performed to ensure that an incident is resolved in an efficient manner and does not persist for an unsuitable amount of time. In some embodiments, this action threshold check may be performed at the respective observer phases during the recommended action stage (e.g., operations 706-1-706-n).

At operation 714, if the action threshold has not been reached, the selected action may be executed. For example, if the highest prioritized action was to restart all processes in a given cluster, that action of restarting all processes in the given cluster may be executed. After the execution of the selected action, the observability loop may then return to operation 702 and collect information in its next iteration of the observability loop. The observability loop may wait until results of the executed action can be observed.

Figure 8:
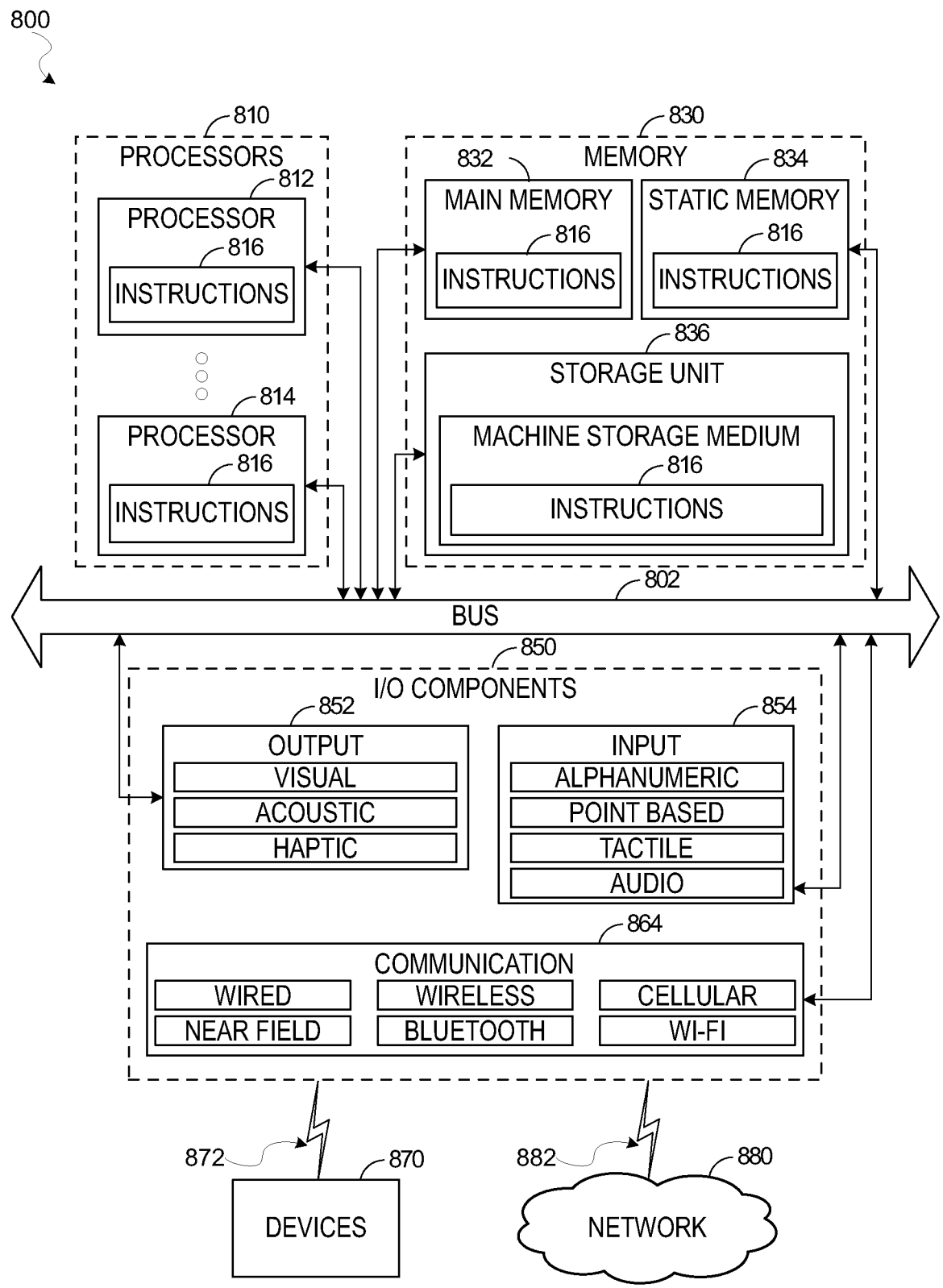
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., the remote computing device 106, the access management system 110, the compute service manager 112, the execution platform 114, the access management system 118, the Web proxy 120) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 118, the compute service manager 112, the execution platform 114, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: collecting, by one or more hardware processors, information relating to a health of a cluster of devices; providing a plurality of observer phases, each observer phase to perform operations comprising: receiving the information relating to the health of the cluster of devices, analyzing the information for a respective parameter, each observer phase analyzing the information for a different parameter, creating or updating an incident based on the analyzing the information for the respective parameter, and generating a recommended action based on the incident; ranking the recommended actions from the plurality of observer phases; selecting a highest ranked recommended action based on the ranking; and executing the selected highest ranked action on the cluster of devices Example 2. The method of example 1, wherein only the selected highest ranked action is executed in a single iteration of the method.

Example 3. The method of any of examples 1-2, wherein the information includes operational metric information provided in response to a status command.

Example 4. The method of any of examples 1-3, wherein the information includes topology information about the cluster of devices.

Example 5. The method of any of examples 1-4, wherein the ranking is further based on degrees of disruption to operation of the cluster of devices.

Example 6. The method of any of examples 1-5, wherein the cluster of devices include machines implementing a transactional database.

Example 7. The method of any of examples 1-6, further comprising: wherein user data and metadata are stored together in the transactional database.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
  collecting, by one or more hardware processors, information relating to a health of a cluster of devices, the information including operational metrics regarding the cluster;
  providing a plurality of observer phases, each observer phase monitoring a different parameter of a plurality of parameters of the cluster of devices in parallel, each observer phase to perform operations comprising:
    receiving the information relating to the health of the cluster of devices, the information including operational metrics and internal state information regarding the cluster of devices, the internal state information including cluster topology information, analyzing the information for a respective different parameter of the plurality of parameters, each observer phase analyzing the information for the respective parameter, determining, for the respective parameter, that an incident is appropriate based on the analyzing the information for the respective parameter, checking whether a prior incident was created, in the event no prior incident was created, creating the incident based on the analyzing the information for the respective parameter, the incident comprising a collection of metadata relevant to health of the cluster of devices for the respective observer phase, in the event a prior incident was created, updating the incident based on the analyzing the information for the respective parameter, the updated incident comprising metadata for one or more prior actions taken to resolve the incident, and generating a respective recommended action related to the respective parameter based on the created or updated incident, the respective recommended action being independent of other observer phases of the plurality of observer phases and not taking into consideration parameters monitored by other observer phases of the plurality of observer phases, and no recommended action being generated for the respective parameter in the event the incident is not created or updated;

ranking the respective recommended actions for the plurality of parameters from the plurality of observer phases, the ranking being based on degrees of disruption to operation of the cluster of devices, wherein at least one recommended action pertains to all devices in the cluster of devices;

selecting a single recommended action based on the ranking, the selected action being a recommended action from a single observer phase from the plurality of phases and without taking into consideration other observer phases of the plurality of phases; and executing the selected action on the cluster of devices in a single iteration of the method.

2. The method of claim 1, wherein the selected action is a highest ranked action with respect to the degrees of disruption.

3. The method of claim 1, wherein the information includes operational metric information provided in response to a status command.

4. The method of claim 1, wherein the information includes topology information about the cluster of devices.

5. The method of claim 1, wherein the cluster of devices include machines implementing a transactional database.

6. The method of claim 5, wherein user data and metadata are stored together in the transactional database.

7. A machine-storage medium embodying instructions that, when executed by a machine, cause the machine to perform operations comprising:

collecting information relating to a health of a cluster of devices, the information including operational metrics regarding the cluster;

providing a plurality of observer phases, each observer phase monitoring a different parameter of a plurality of parameters of the cluster of devices in parallel, each observer phase to perform operations comprising:

receiving the information relating to the health of the cluster of devices, the information including operational metrics and internal state information regarding the cluster of devices, the internal state information including cluster topology information, analyzing the information for a respective different parameter of the plurality of parameters, each observer phase analyzing the information for the respective parameter, determining, for the respective parameter, that an incident is appropriate based on the analyzing the information for the respective parameter, checking whether a prior incident was created, in the event no prior incident was created, creating the incident based on the analyzing the information for the respective parameter, the incident comprising a collection of metadata relevant to health of the cluster of devices for the respective observer phase, in the event a prior incident was created, updating the incident based on the analyzing the information for the respective parameter, the updated incident comprising metadata for one or more prior actions taken to resolve the incident, and generating a respective recommended action related to the respective parameter based on the created or updated incident, the respective recommended action being independent of other observer phases of the plurality of observer phases and not taking into consideration parameters monitored by other observer phases of the plurality of observer phases, and no recommended action being generated for the respective parameter in the event the incident is not created or updated;

ranking the respective recommended actions for the plurality of parameters from the plurality of observer phases, the ranking being based on degrees of disruption to operation of the cluster of devices, wherein at least one recommended action pertains to all devices in the cluster of devices;

selecting a single recommended action based on the ranking, the selected action being a recommended action from a single observer phase from the plurality of phases and without taking into consideration other observer phases of the plurality of phases; and executing the selected action on the cluster of devices in a single iteration of the operations.

8. The machine-storage medium of claim 7, wherein the selected action is a highest ranked action with respect to the degrees of disruption.

9. The machine-storage medium of claim 7, wherein the information includes operational metric information provided in response to a status command.

10. The machine-storage medium of claim 7, wherein the information includes topology information about the cluster of devices.

11. The machine-storage medium of claim 7, wherein the cluster of devices include machines implementing a transactional database.

12. The machine-storage medium of claim 11, wherein user data and metadata are stored together in the transactional database.

13. A system comprising:

at least one hardware processor; and at least one memory storing instructions that, when executed by the at least one hardware processor, cause the at least one hardware processor to perform operations comprising:

providing a plurality of observer phases, each observer phase monitoring a different parameter of a plurality of parameters of the cluster of devices in parallel, each observer phase to perform operations comprising:

receiving the information relating to the health of the cluster of devices, the information including operational metrics and internal state information regarding the cluster of devices, the internal state information including cluster topology information, analyzing the information for a respective different parameter of the plurality of parameters, each observer phase analyzing the information for the respective parameter, determining, for the respective parameter, that an incident is appropriate based on the analyzing the information for the respective parameter, checking whether a prior incident was created, in the event no prior incident was created, creating the incident based on the analyzing the information for the respective parameter, the incident comprising a collection of metadata relevant to health of the cluster of devices for the respective observer phase, in the event a prior incident was created, updating the incident based on the analyzing the information for the respective parameter, the updated incident comprising metadata for one or more prior actions taken to resolve the incident, and generating a respective recommended action related to the respective parameter based on the created or updated incident, the respective recommended action being independent of other observer phases of the plurality of observer phases and not taking into consideration parameters monitored by other observer phases of the plurality of observer phases, and no recommended action being generated for the respective parameter in the event the incident is not created or updated;

ranking the respective recommended actions for the plurality of parameters from the plurality of observer phases, the ranking being based on degrees of disruption to operation of the cluster of devices, wherein at least one recommended action pertains to all devices in the cluster of devices;

selecting a single recommended action based on the ranking, the selected action being a recommended action from a single observer phase from the plurality of phases and without taking into consideration other observer phases of the plurality of phases; and executing the selected action on the cluster of devices in a single iteration of the operations.

14. The system of claim 13, wherein the selected action is a highest ranked action with respect to the degrees of disruption.

15. The system of claim 13, wherein the information includes operational metric information provided in response to a status command.

16. The system of claim 13, wherein the information includes topology information about the cluster of devices.

17. The system of claim 13, wherein the cluster of devices include machines implementing a transactional database.

18. The system of claim 17, wherein user data and metadata are stored together in the transactional database.

* * * * *